Aug. 5, 1924.
L. E. WALLIS ET AL
1,503,567
ROPE FASTENER
Filed Aug. 6, 1923
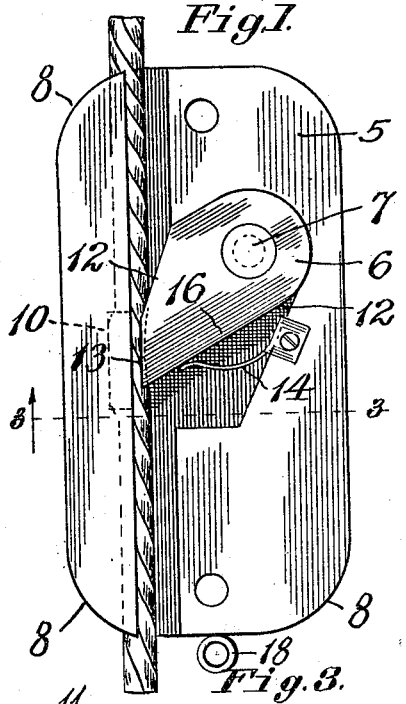
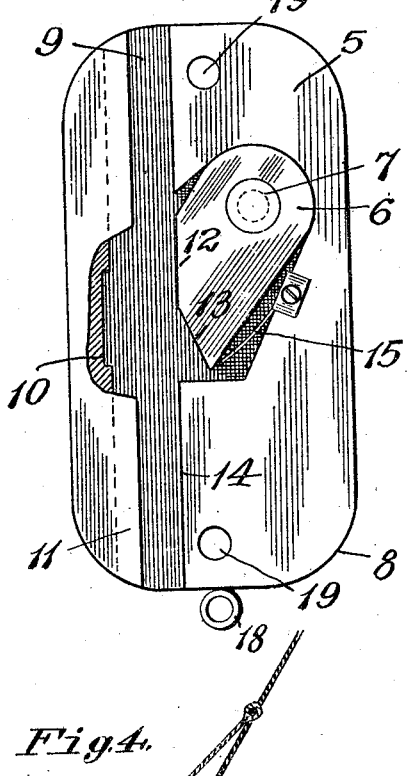
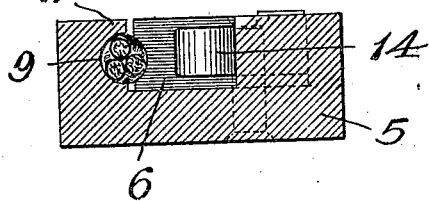
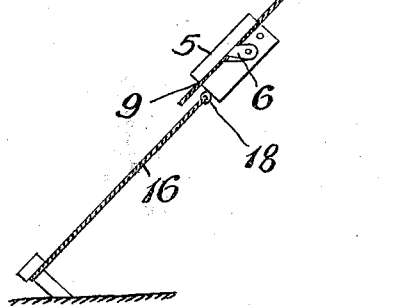
INVENTORS
Lewis E. Wallis,
BY Lafayette Higgins.
Munn+Co ATTORNEYS.

Patented Aug. 5, 1924.

1,503,567

UNITED STATES PATENT OFFICE.

LEWIS E. WALLIS AND LAFAYETTE HIGGINS, OF MONROVIA, CALIFORNIA.

ROPE FASTENER.

Application filed August 6, 1923. Serial No. 656,043.

*To all whom it may concern:*

Be it known that we, LEWIS E. WALLIS and LAFAYETTE HIGGINS, citizens of the United States, and residents of Monrovia, county of Los Angeles, and State of California, have invented a new and useful Rope Fastener, of which the following is a specification.

This invention relates to rope fasteners generally.

We particularly direct our invention to a novel combination of parts which may be used to great advantage in firmly securing a rope end in a fixed or planned condition. The manner of constructing and combining the parts of our invention very nicely permits of use of the invention in connection with riggings of ships, guy ropes of tents, et cetera, or same may be employed in lieu of the old and well known forms of cleats.

An important feature of the invention is to provide a rope fastener which will be effective for the purpose intended and which will consist of mating parts that can be quickly brought into clamped engagement with the rope to be secured, and wherein said parts are not apt to be casually released from the rope when one brushes by and against same, or through accidental contact of objects therewith.

Our invention, therefore, comprises certain new features of construction and arrangement and combination of elements hereinafter set forth and pointed out in the claims annexed hereto.

In the drawings,

Figure 1 is a plan view of the rope fastener showing the dog thereof in clamped relation to a rope, Figure 2 is a similar view showing the dog released, Figure 3 is a transverse section on line 3—3 of Figure 1, and Figure 4 is a conventional view illustrating the manner of connecting the fastener to the respective ends of the guy rope of a tent.

The invention essentially consists of two main parts (5) and (6), the latter being in the nature of a dog and the former in the form of a block or body member, and the two are connected together by a suitable pivot pin (7).

The part or body (5) may be formed of wood, metal, fiber, or any other suitable well known material. This body is comparatively thick as shown in Figure 3 and same is also preferably of rectangular shape, the corners of which are rounded at (8). Formed in the block is a longitudinal groove (9) which opens laterally onto one side of the block as clearly shown in the drawings. One wall of the groove at a point between the ends of the block is undercut, or provided with a depression (10). Another wall of the groove is formed with an overhang (11). The width of the groove is approximately equal to the normal diameter of the rope to be accommodated so that the rope can be freely inserted in or removed from the groove upon the application of lateral force thereof, and the rope subsequently moved, or the block (5) shifted with respect to the rope so as to bring a portion of the rope beneath the overhang (5) of the groove. In this manner it will be observed that the rope is held against accidental lateral displacement from the groove.

The dog (6) is accommodated in a recess (12) which opens onto one face of the block and which also communicates with the groove (9). This dog is provided with angular surfaces (12) and (13) respectively, and when the dog is moved to the position shown in Figure 2 the surface (12) thereof is approximately in alignment with the straight wall (14) of the groove (9). When in the position shown in Figure 1 the surface (13) is projected into the slot and against the rope. The rope is then advanced against the walls of the recess (10) in order that it may be crimped to a slight extent. This recess (10) therefore coacts with the dog to hold the rope against longitudinal movement in said groove (9). The dog (6) comes flush with the outer surface of the block (5) so that no parts thereof will be exposed where they might be brought into contact with objects that would derange the dog with respect to the rope and perhaps lead to temporary disconnection of parts. In order that the dog may be held yieldingly against the rope and automatically retained in this position I provide the block with a leaf spring (15) or the equivalent thereof over which the straight face (16) of the dog is free to ride when the dog is adjusted to its different positions.

When the fastener is used to secure the ends (16) and (17) of the guy rope of a tent, or the like, the rope (17) is passed into the groove (9) and associated with the dog (6) as aforesaid. It will of course be understood that before this is accomplished the free end of the rope (17) is drawn tightly in a downward direction until it is tensioned to the desired extent. The rope end (16) is connected in an eye (18) at one end of the block (5) and it is then passed around the ground stake in the usual manner.

When the fastener is used upon the deck of a vessel or some other flat surface where it is desired to anchor the free end of a rope, we simply secure the block to the deck or wall and to facilitate this we form openings (19) in the ends of the block.

A fastener constructed in accordance with the description contained herein is simple and the parts essential to its operation are few and are so combined as to be extremely effective in their office as a clamp to secure a rope end in a fixed position of adjustment.

We claim:

1. A rope fastener comprising a block formed with a longitudinal, laterally, opening groove having an overhanging wall and an intermediate recess, and a yieldable dog movable respectively into and out of the groove and with respect to the recess and coacting therewith to cause a crimp to be formed in a rope when arranged in the groove and engaged by the dog, and said block having a recess therein to accommodate the dog, and the said dog being of a thickness with respect to the depth of the recess so that the outer face of the dog comes flush with the outer face of the block.

2. A rope fastener comprising a grooved block, the block having a recess opening laterally into the groove, and a pivoted dog having a plurality of angularly disposed surfaces, one of which is adapted to fall in alignment with one wall of the groove on one adjusted position of the dog, and the other of said surfaces being arranged in a second position of adjustment of the dog to be advanced into said groove as and for the purpose set forth.

LEWIS E. WALLIS.
LAFAYETTE HIGGINS.